United States Patent [19]
Collingwood et al.

[11] 3,731,815
[45] May 8, 1973

[54] FILTER AND METHOD OF MANUFACTURE

[75] Inventors: George H. Collingwood, Hopewell; Robert C. Wincklhofer; Gene C. Weedon, both of Richmond, all of Va.

[73] Assignee: Allied Chemical Corporation, New York, N.Y.

[22] Filed: Apr. 26, 1972

[21] Appl. No.: 247,901

Related U.S. Application Data

[63] Continuation of Ser. No. 825,575, May 19, 1969, abandoned.

[52] U.S. Cl. ............... 210/496, 210/497, 210/499, 210/510, 161/150
[51] Int. Cl. ............................................ B01d 39/10
[58] Field of Search ............... 210/499, 490, 491, 210/506, 507, 508, 510; 161/175, 150, 170, DIG. 5

[56] References Cited

UNITED STATES PATENTS

| | | | |
|---|---|---|---|
| 3,038,235 | 6/1962 | Zimmerman | 161/175 X |
| 3,500,991 | 3/1970 | Vogt | 210/496 X |
| 2,732,946 | 1/1956 | Schaub | 210/497 X |
| 3,099,067 | 7/1963 | Merriam | 161/DIG. 5 |
| 3,382,305 | 5/1968 | Breen | 161/DIG. 5 |

FOREIGN PATENTS OR APPLICATIONS

| | | | |
|---|---|---|---|
| 930,074 | 7/1963 | Great Britain | 161/DIG. 5 |
| 1,043,762 | 9/1966 | Great Britain | 161/DIG. 5 |
| 1,076,175 | 7/1963 | Great Britain | 161/DIG. 5 |
| 1,310,150 | 10/1962 | France | 210/499 |

*Primary Examiner*—Samih N. Zaharna
*Assistant Examiner*—F. F. Calvetti
*Attorney*—Patrick L. Henry

[57] ABSTRACT

Filters for petroleum based liquids and the like are manufactured from heat-treated fabric composed of filaments prepared from blended composite fibers. In general the filter is characterized by light weight, corrosion resistance, compatibility with petroleum based liquids, low cost, dimensional stability, and resistance to shock and other mechanical abuse.

14 Claims, 2 Drawing Figures

Patented May 8, 1973

3,731,815

INVENTOR.
George H. Collingwood
Robert C. Wincklhofer
Gene C. Weedon

BY Roy H Massengill
ATTORNEY

FILTER AND METHOD OF MANUFACTURE

This is a continuation of application Ser. No. 825,575 filed May 19, 1969 now abandoned.

BACKGROUND OF THE INVENTION

1. Field of the Invention

The present invention relates to a filter and the method for making it through the use of multi-component and/or mechanically blended filaments which are formed into a fabric and subsequently heated to cause a self-bonding of the filaments and to place them in a state that they can plastically be formed into the desired shape of the filter. The multi-component filamentary material is comprised of at least two different fiber-forming polymeric materials joined together in individual filaments by concurrent extrusion in intimate composite relationship. The mechanically blended filamentary material is comprised of at least two different fiber-forming polymeric materials which have been mechanically blended either as continuous filaments, staple fibers, or a combination of the two. Additionally, multi-component filamentary material can be mechanically blended with either similar or different polymeric materials.

2. Description of the Prior Art

Filters are widely used in industry and commerce and in the home for a variety of duties to separate large solid particles from a fluid flowing through the filter. Heretofore, these filters have been especially valuable for separating solid particles from petroleum products such as gasoline and the like. A large number of these filters have been formed from woven metal wires which are shaped in a cup-like fashion and have a solid metal peripheral flange fastened thereto. Filters have been formed of a variety of materials in a variety of shapes and pore sizes, depending on the desired application.

SUMMARY OF THE INVENTION

In accordance with the present invention, unique new filters are formed of filaments with widespread useful value, especially when used in connection with petroleum products. The art is familiar with multi-component yarns made from different materials extruded together in side-by-side relationship or in a sheath-core relationship, as shown for example in U.S. Pat. Nos. 3,117,362 and 3,316,589.

In the copending application Ser. No. 727,326 filed May 7, 1968, filters are produced from multi-component filamentary material, which as used herein, means filament made by inclusion of at least two different fiber-forming polymeric materials extruded together in a side-by-side or sheath-core arrangement and having different melt temperatures. Although not essential, it is preferred that this temperature difference be approximately 10° C or more. The materials are each preferably present in the filaments in approximately 50 parts by weight, although the lower melting component may vary from 40–95 parts by weight. The materials are such that they will adhere to each other during filament formation and thereafter during heat-treatment as will be described.

In Ser. No. 727,326 cited above, it was disclosed that fabric made from multi-component filaments could be heated under appropriate conditions to produce novel filters having improved physical properties, yet retaining a fabric or textile appearance, even after heat-treating to a considerable degree. The latter involved sufficient heating to produce a fusion of adjacent yarn elements. Similarly, mechanically blended filamentary material composed of at least two different fiber-forming polymeric materials may be heated to a setting temperature without significant flow or cross-sectional flattening or disfiguration, thereby permitting controllable porosity with improved strength and other advantages hereinafter discussed. Thus, an important feature of this invention is that a composite fiber relationship is intentionally created and preserved throughout the heat-setting phases of filter production. It was discovered that various polymer blend systems having at least two polymers of varying melt temperatures can be employed to produce filters of stabilized shape. In general, this invention provides filters and methods of producing the same in a variety of shapes and pore sizes and compatible with a variety of fluids.

As used herein the term multi-component filament is intended to have the following meaning:

Multi-component filaments — filaments made from at least two polymeric materials, the two materials having substantially different melt temperatures such that fibrous constructions composed thereof can be heat-set by application of heat below the melt temperature of one and equal to or above that of the other, the entire filament composition or any component thereof optionally including any secondary material compatible with the heat-set property of the fabric as a whole such as antioxidants and other stabilizing agents, reinforcing particles, fillers, adhesion promoting agents, fluorescent materials, dispersing agents, and others useful in polymerization, extruding, spinning, fabric forming and shaping, heat-setting and product finishing techniques. If desired, inorganic materials such as metal whiskers, fiber glass fibrils, asbestos particles and the like may be incorporated for conductive and/or reinforcement purposes.

PREFERRED EMBODIMENTS

Figure 1:
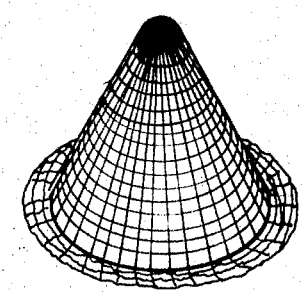
FIG. 1 shows a perspective view of a filter formed in accordance with the teachings of this invention.

In fabric association with the multi-component or blended yarn, as mentioned above, a wide variety of materials useful in producing fabric may be used, the only limiting criteria for selection of such a material being that it occur as, or may be processed into, a filament or yarn which is further capable of withstanding the temperature necessary to produce the desired stiffness with the other yarn components being employed in the structure of the fabric article, whether the fabric article be woven, knitted, or otherwise prepared. Such other materials which are suitable are natural fibers of animal origin such as wool, vegetable origin such as cotton, flax, linen, hemp, jute, etc., and mineral origin such as asbestos, glass and spun glass. Modified fibers including cyanoethylated cotton, mercerized cotton and non-shrinkable wool as well as various synthetics may also be employed.

Suitable materials useful in the multi-component or blended filaments for purposes of this invention are any fiber-forming thermoplastic polymeric materials such as polyamides, polyolefins, polyesters, polycarbonates, polysulfones, and polyphenylene oxides, for example. Where sheath-cove filaments are employed, the sheath should be the lower melting component to assure proper stiffening by application of heat. In either case the higher melting single entity or blended component is sufficiently resistant to heat and has sufficient affinity for the lower melting component that flow or substantial deformation of the latter is retarded or prevented; and coupled with the heat-treating conditions employed which are relatively short time periods sufficient to achieve stiffening but normally at or only slightly above the melt temperature of the lower melting component, original shape and size integrity of the filaments is maintained.

In the preferred embodiment of this invention, a bicomponent yarn was used, which is 40 percent nylon 6,6 as one component and 60 percent of a nylon copolymer of which 50 percent is nylon 6 and nylon 6,6 in equal amounts and the remaining 50 percent nylon 6,10. The components were spun from separate polymer melts in a side-by-side relationship and remained adhered together during quenching and subsequent processing.

A 140 denier bicomponent yarn prepared as described above was fashioned into a jersey circular knit fabric using conventional knitting equipment (hereinafter referred to as Fabric A). The weight of the fabric was 5 ounces per square yard. Next, a 60° stainless steel cone 4 inches in height and 4 inches in diameter across the base and a large radius of curvature at the tip, and a 60° Pyrex glass cone 3½ inches in both height and base diameter were heated in a forced draft oven. When the oven had maintained the preselected temperature for 10 minutes, the oven door was opened quickly and the fabric was rapidly positioned above the top of the metal cone. The glass cone was placed above the fabric and then quickly thrust downward by hand toward the metal cone. A 2,000 gram weight was positioned at the top or apex of the glass cone to maintain fabric-mold contact. The optimum balance between strength and other characteristics is obtained with application of heat in this manner at 240° C for 30–60 seconds although satisfactory results were achieved within the range of 230°–250° C. over different time periods. The resulting conical filter similar to FIG. 1 was thereby produced which upon testing was found to be tough and rigid with a uniform pore size that was locked in place since all the filaments were self-bonded to one another at their point of intersection.

Preferably, the bicomponent yarns are comprised of a discrete polymer or copolymer forming an individual component; however, one or more of the components may be a matrix-type component spun from a polymer blend such as disclosed in U.S. Pat. No. 3,369,057. For example, a matrix-type component would be spun in a side-by-side relationship with another polymer composition, preferably a composition similar to the matrix-forming composition so better fusion of the components will be achieved.

As an example of a sheath-core yarn, nylon 6 can be used as a sheath material and nylon 6,6 as a core in equal amounts by weight in a jersey circular knitted fabric of the type described above, heated at a temperature of between 230° to 260° C being the optimum. The results with the sheath-core will not be as good as with the side-by-side multi-component, but improved properties can be achieved over filters of the prior art.

For any given multi-component formulation, the temperature and time will vary for increasing stiffness, depending on the polymeric materials involved, article size, shape, fabric construction, i.e., woven, non-woven, knitted, loose, tight, etc., insured rigidity, mode of heat application and other variables. In general, it is necessary to apply heat without excessive degradation and of sufficient intensity and duration at least as high as the melting point of the lower melting component. Thus no empirical or mathematical formula has been found for determining the minimum or maximum heating conditions to effect the multi-component yarns, appearance and degree of stiffness after heating being the most important criteria. Where the polymeric components or other filamentary material employed have substantial differences in shrinkage or other deforming characteristics under the heat-treating conditions, it is necessary to restrain the material or otherwise counteract these differences by conventional means.

The multi-component yarns may be prepared by mechanically mixing staple fibers having melt temperatures differing by at least 10° C to form said yarns. Also, continuous filaments prepared from polymeric materials having melt temperatures differing by at least 10° C may be plied together to form multi-component yarns that may be employed by the present invention. Preferably, the component having the higher melt temperature should comprise at least 50 percent of the yarn to prevent undesirable flow of the lower melting component when heated above the melt temperature of said lower melting component.

Table I illustrates how non-woven filters prepared from mechanically blended staple fibers can be prepared with differing properties by varying the blend level or the fusing conditions.

TABLE I.—PROPERTIES OF FUSIFORMED NON-WOVENS[1]

| Percent nylon 6 staple | Percent polyester staple | Weight, oz./sq. yd. | Breaking strength, lbs./in. width | U.E., percent | Shrinkage, percent | Air retardance,[2] cu. ft./30 min. | Molding conditions | | Tabor[3] abrasion |
|---|---|---|---|---|---|---|---|---|---|
| | | | | | | | Time, sec. | Pressure, p.s.i. | |
| 50 | 50 | 4 | 26 | 42 | 1.9 | 0.11 | 60 | 0 | Excellent. |
| 50 | 50 | 6 | 38 | 42 | 1.6 | 0.11 | 60 | 0 | Do. |
| 50 | 50 | 8 | 51 | 42 | 1.3 | 0.09 | 60 | 0 | Do. |
| 50 | 50 | 9.3 | 63 | 41 | 1.0 | 0.18 | 60 | 0 | Do. |
| 50 | 50 | 4 | 25 | 20 | 1.3 | 0.38 | 15 | 165 | Do. |
| 50 | 50 | 6 | 42 | 24 | 1.0 | 0.26 | 15 | 165 | Do. |
| 50 | 50 | 8 | 56 | 26 | 0.6 | 0.32 | 15 | 165 | Do. |
| 50 | 50 | 9.3 | 72 | 27 | 0.6 | 1.16 | 15 | 165 | Do. |
| 35 | 65 | 4 | 22 | 24 | 1.3 | 0.05 | 60 | 0 | Failed at 111 cycles. |
| 35 | 65 | 6 | 43 | 28 | 1.0 | 0.05 | 60 | 0 | Failed at 120 cycles. |
| 35 | 65 | 8 | 43 | 24 | 1.3 | 0.02 | 60 | 0 | Failed at 308 cycles. |
| 35 | 65 | 4 | 39 | 28 | 1.0 | 0.06 | 15 | 165 | Excellent. |
| 35 | 65 | 6 | 54 | 29 | 0.3 | 0.10 | 15 | 165 | Do. |
| 35 | 65 | 8 | 80 | 30 | 0.3 | 0.17 | 15 | 165 | Do. |

[1] Uniaxially carded batts, cross laminated 90°, 2-inch staple of 4.7 denier per filament crimped, exposure temperature of 240° C.
[2] One inch discs at 1.0 p.s.i. differential, retardance is difference between air flow with and without sample in line, initial flow without sample is 1.590 cu. ft./30 minutes.
[3] 1,000 cycles with CS-10 wheel and 500 gm. weight.

Several heating and forming systems may be used in making the filters, as for example, a forced air oven with a nitrogen purge, a static draft oven without nitrogen, heated match-die molds, a molding press, fluid thermoforming using a non-porous diaphragm, and a steam autoclave.

For any given multi-component or mechanically blended formulation, the temperature and time will vary depending on the polymeric materials, strainer size, shape, desired rigidity, mode of heat application and other variables. In general, it is necessary to apply heat without excessive degradation of sufficient intensity and duration at least as high as the melting point of the lower melting component until the fabric yarns have fused to each other yet still retain the desired porosity. If the fabric yarns are spun from staple fibers, the fibers forming said yarn will fuse together individually in addition to fusion at the cross points of said fabric. Fusion can be achieved without undesirable flow; it is this phenomenon which permits the present invention to provide unique dimensional stability and porosity and formability to textile materials and, therefore, regulates the minimum and maximum heat-set conditions. Thus, the fabric interstices are not closed by the fusion as described herein since there is no polymer flow or migration except that due to forming of the fabric into a non-planar shape.

The porosity of the fabric structures of this invention may be controlled by the types of yarns employed and conditions of treatment. For example, fabrics prepared from high shrinkage fibers and not restrained during heat treatment may be shrunk until the interstices thereof are practically closed whereby a microporus filter material is produced. Naturally, the time for fusion is dependent on many factors, including the filament or yarn size, fabric construction, i.e., knit, weave, loose, tight, etc., and the shape of the filter desired from the fusion and forming process. Thus, time periods are determined by the mass to be heated and the type of heat source employed. For example, when employing an oven, durations as short as 15–20 seconds at 240° C. have been found effective for at least partial fusion. Fusion times of up to 300 seconds and longer at 250° C. have been tested for Fabric A, and although fusion was achieved, the breaking strength of the fabric filter was reduced somewhat.

The fabric provided for making filters can vary greatly as to porosity, denier and other characteristics desired in the finished filter. The techniques for fusing and forming the fabric into the desired filter can be most of those used in traditional plastic sheet thermoforming, suitably modified to apply the correct temperature and able to withstand any shrinkage forces generated by the fabric during the fusing and forming steps.

As a specific example of practicing the invention, a plied yarn was prepared using a 100 denier 32 filament nylon 6 yarn in combination with a 40 denier 27 filament polyester yarn. The plied yarn was then knitted on conventional knitting equipment into a fabric having 44 courses per inch and 28 wales per inch. This fabric was then shaped into a conical filter by loosely clamping the fabric between two matched dies at an oven temperature of 240° C. for sufficient time to permit the formation of the conical filter and permit sufficient fusion of the fabrics so that all of the interconnecting filaments and yarn would be self-bonded at the point of contact. The conical filter had a depth of 3 inches, a diameter of three inches, and was surrounded by a ½ inch flange such as shown in FIG. 1 of the drawings. It was found that because of the loose clamping of the original fabric, substantial slippage took place which accounted for the porosity of the filter not being greatly larger than that of the unfused and unformed fabric. The porosity of the formed filter was such that it was equivalent to 41 courses per inch and 24½ wales per inch with the largest pores being less than 1 millimeter in size. The filter was of substantially uniform porosity, semi-rigid, substantially crease resistant and impervious to gasoline and other petroleum products. The individual filaments in a single yarn are all bonded together giving a neat appearance and precluding any linting or other loose material from falling therefrom. Because of the consolidation of the individual filaments in the yarn and the stretching of the fabric during the forming, the pore size was larger than that of the unfused and unformed fabric but not greatly so, and it still maintained the substantially uniform size of the fabric from which it was made. The filter was strong and readily cleaned, and since no bonding agent was needed a superior porosity control and chemical control of the filter was provided.

The immediately preceding example was duplicated using a spacing in the knit fabric of 30 courses per inch and 20 wales per inch in order to provide a filter having increased porosity. The example was repeated for a third time but using the knit fabric having 55 courses per inch and 40 wales per inch. This provided a filter having less porosity than the other two.

Figure 2:
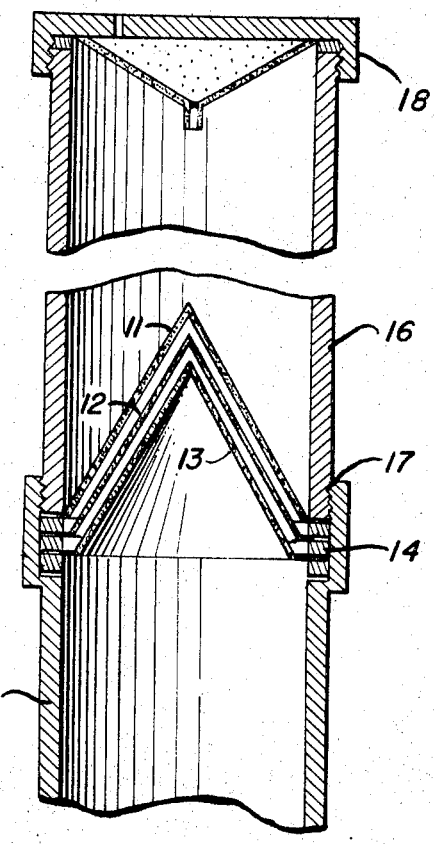
FIG. 2 shows three filters mounted concentrically in a tube for straining fluid.

Reference is now made to FIG. 2 of the drawing, where a filter assembly is provided which is the conduit leading into a gasoline tank. The filter assembly consists of conical filter 11 having the greatest porosity, conical filter 12 having the intermediate porosity, and conical filter 13 having the finest porisity, all mounted between gaskets 14 to space them from one another and provide a liquid-tight seal between the lower conduit 15 and the neck 16 of the conduit, which are inserted one into the other as shown at 17 until the gaskets and flanges of the three filters compress tightly enough to prevent liquid leakage. The upper portion of neck 16 is closed by a filler cap 18 screwed thereon.

FIG. 2 serves to schematically show one filter assembly using the filter of this invention for gasoline and other petroleum products. Any solid particles of a coarse nature would first be trapped by filter 11 and the finer particles that pass through filter 11 would be trapped by filters 12 and 13.

Of course, any desired porosity can be provided as the invention is easily adapted to mass produce filters of many configurations and many porosities at both a low cost for the tooling and a low cost for the finished product and although it is primarily applicable to gasoline tanks as well as other petroleum installations, it can be used in many other similar fields where a filter of the nature of the present invention is desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A filter element having a porous layer of textile material with a fibrous structure of the class consisting of multi-component filaments comprised of at least two different polymeric materials joined together in individual filaments by concurrent extrusion in intimate composite relationship and mechanically blended filaments comprised of at least two different polymeric materials; said filaments being self-bonded to one another at their points of intersection.

2. An article as defined in claim 1 wherein said different polymeric materials are selected from the group consisting of polyolefins, polyamides, polyesters, polysulfones, polyphenylene oxides and polycarbonates.

3. An article as defined in claim 2 wherein said polymeric materials are extruded in continuous side-by-side relationship.

4. An article as defined in claim 2 wherein said polymeric materials are extruded in a sheath-core relationship, the sheath component being of lower melting material.

5. An article as defined in claim 2 wherein one polymeric material is a polyamide and the other polymeric material is a polyester.

6. The filter of claim 1 wherein said porous layer is surrounded by a flange with a substantial portion of said layer inside said flange lying in a different plane from said flange such as a cone.

7. A filter of claim 6 mounted in a conduit for conveying petroleum products.

8. An article as defined in claim 1 wherein the mechanically blended filaments are comprised of staple fibers prepared from at least two polymeric materials having melt temperatures differing by at least 10° C.

9. The method of making a filter by: taking filaments of the class consisting of multi-component filaments comprised of at least two different polymeric materials joined together in individual filaments by concurrent extrusion in intimate composite relationship and mechanically blended filaments comprised of at least two different polymeric materials, said filaments consisting of a first polymer having a melting point at least 10°C lower than a second polymer, fabricating said filaments into a porous textile material, and forming said textile material into a filter by self-bonding filaments to one another at their points of intersection by heating to a temperature above the fusion point of said first polymer and below the fusion point of said second polymer.

10. The process of claim 9 wherein a multiplicity of filaments are plied into a yarn which is then used for fabricating into a porous textile material, the diameter of said yarn being materially reduced by said heating step.

11. The process of claim 9 wherein the heating step is carried out between about 230° and 250° C.

12. The process of claim 11 wherein a multiplicity of said filaments are plied into a yarn which is then fabricated into a proous textile material, the diameter of said yarn being materially reduced by said heating step due to the self-bonding and consolidation of adjacent filaments.

13. The process of claim 12 wherein said forming step includes clamping a layer of said textile material about a periphery and pressing that portion inside the periphery into a three-dimensional shape.

14. The process of claim 13 wherein the textile material is free to retract whereby the interstices of said material are reduced from shrinkage of said material to form a microporus structure.

* * * * *